March 8, 1966  D. W. LAWSON  3,239,424
NEUTRON SHIELDING
Filed March 14, 1963  2 Sheets-Sheet 1
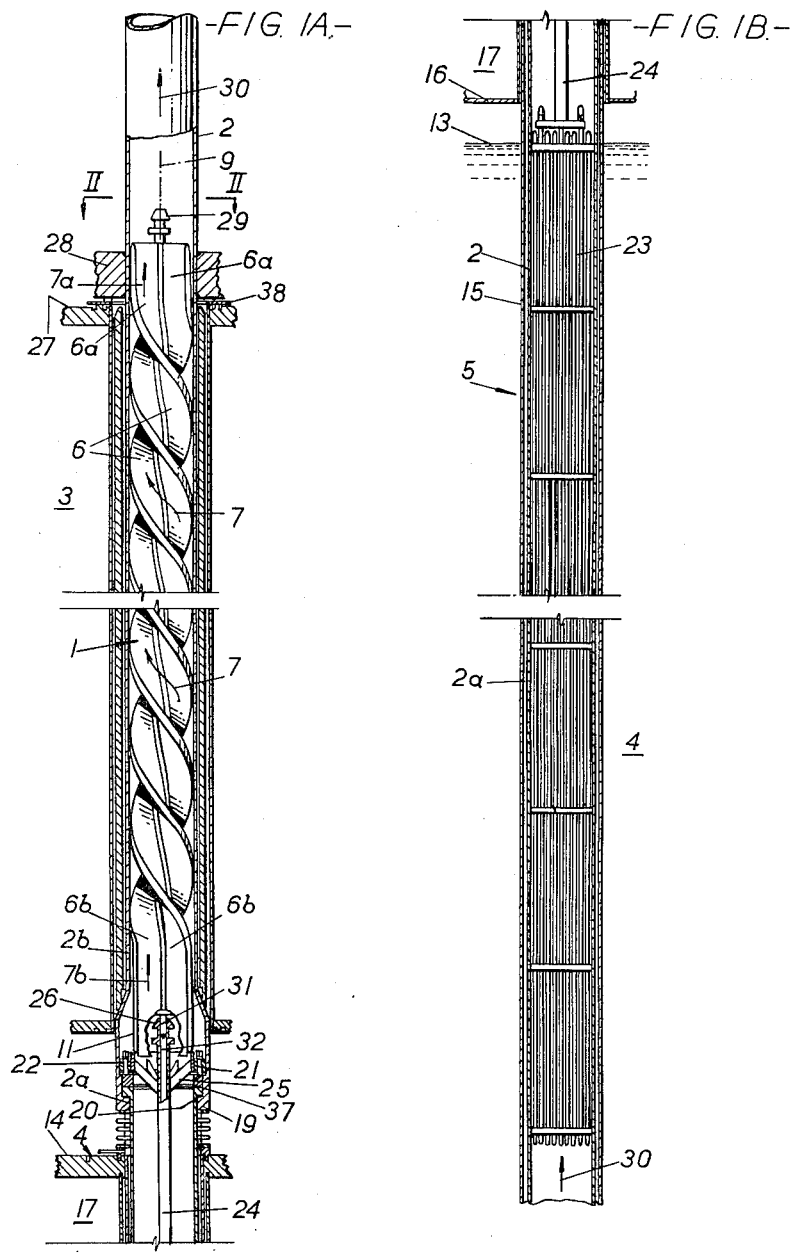

March 8, 1966   D. W. LAWSON   3,239,424
NEUTRON SHIELDING
Filed March 14, 1963   2 Sheets-Sheet 2
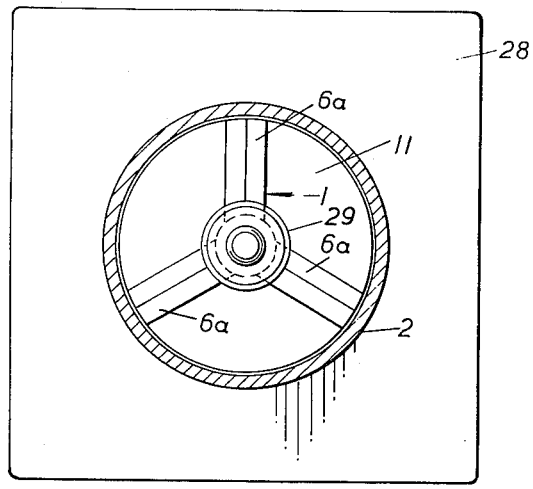
-FIG. 2.-
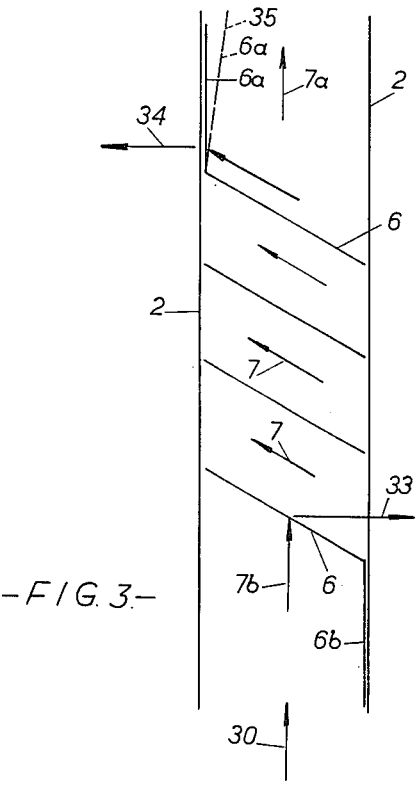
-FIG. 3.-

United States Patent Office 3,239,424
Patented Mar. 8, 1966

3,239,424
NEUTRON SHIELDING
Donald Wilfred Lawson, Hale, England, assignor to United Kingdom Atomic Energy Authority, London, England
Filed Mar. 14, 1963, Ser. No. 265,119
Claims priority, application Great Britain, Mar. 20, 1962, 10,642/62
6 Claims. (Cl. 176—43)

This invention relates to neutron shielding and is concerned with that kind of neutron shielding device known as a neutron scatter plug.

Neutron shielding is used in nuclear reactors to provide protection against harmful neutrons emitted by the reactor core. British specification No. 897,446 discloses a nuclear reactor wherein the reactor core is contained in a pressure vessel and neutron shielding is provided between the core and the walls of the vessel. The neutron shielding is apertured to allow reactor coolant to flow through the shielding and the aperture fitted with a neutron scatter plug comprising an elongate body disposed lengthwise in the aperture and having a number of ribs extending radially to the wall of the aperture and defining a plurality of helical flow paths for reactor coolant. The plug is of material having a high neutron scattering characteristic (for example, stainless steel) and neutrons streaming towards the aperture impinge upon the ribs and are scattered into the surrounding neutron shielding whilst coolant flow through the shielding is unrestricted.

It has been found, however, that coolant flowing into the helical flow paths gives rise to turning forces being exerted on the plug, so that there is a tendency for the plug to rotate, and it is an object of the invention to provide a neutron scatter plug wherein this tendency is restrained.

According to the invention, a neutron scatter plug comprising an elongate body with radially-extending ribs defining a plurality of helical paths for coolant flow along the plug, is characterised by the provision of flow deflectors arranged so that coolant flowing out of said helical paths sets up forces in opposition to turning forces exerted on the plug by coolant flowing into said helical flow paths.

An embodiment of the invention will now be described by way of example with reference to the accompanying drawings, wherein:

FIGURES 1A and 1B combine to provide a fragmentary side view, in medial section, of the upper portion of a nuclear reactor, FIGURE 2 is a sectional view taken on the lines II—II of FIGURE 1A, and FIGURE 3 is a diagrammatic illustration.

Referring to FIGURES 1A, 1B and 2, a neutron scatter plug 1 disposed lengthwise in a vertically orientated coolant channel 2 extending through neutron shielding 3 and a core 4 of a nuclear reactor 5, comprises an elongate body having three radially-extending ribs 6 wound round the axis of the plug to define helical flow paths 7 for coolant flow along the plug. (The direction of coolant flow through the channel 2 is shown by the arrow 30). The ribs 6 have upper and lower flat non-helical extensions 6a, 6b, disposed parallel to the axis of the plug 1 and defining flow paths 7b, 7a, leading coolant out of and into the helical flow paths 7. The extensions 6a also serve to direct coolant flowing out of the helical flow paths 7 to set up forces (as hereinafter explained) in opposition to turning forces exerted on the plug by coolant flowing into the helical flow paths 7.

The reactor 5, which is of the kind disclosed in British specification No. 897,457, is steam-generating and is moderated by heavy water 13 contained in a calandria vessel 14 having a lattice of calandria tubes 15 each locating a channel 2. The upper region of the calandria vessel 14 is divided off by a baffle 16 to define a space 17 filled with heavy water and serving as a neutron reflector above the core 4.

The channel 2 has a lower parts 2a of zirconium alloy which is disposed in the core 4 and an upper part 2b of mild steel which is disposed in the neutron shielding 3. The parts 2a, 2b have flanged ends 18, 19 between which is a gasket 20. The ends, 18, 19 together with a stainless steel compensating ring 37 (which compensates the differences in longitudinal thermal expansion of the parts 2a, 2b), are clamped together by set bolts 21 screwed into rings 22 fitted in the lower ends of the parts 2b. The reactor is fueled by cluster type fuel elements 23 comprising $UO_2$ pellets enclosed in stainless steel sheaths. Each cluster 23 is supported by a central tie 24 carrying at its upper end a spider support 25 which rests upon the ring 37 within the channel 2 in which the fuel element 23 is disposed. Each cluster 23 is transferred to and from the reactor core 4 by a lifting head 26 attached to the tie 24.

The neutron shielding 3 is provided by a mild steel tank 27 filled with light water and covered with a boron steel plate 38 (.25 in. in thickness). The mild steel of the tank 27 (1 inch bottom plate, 2 inch top plate) serves as an inelastic scattering medium for high energy neutrons and as a gamma ray shielding medium. The light water (about 7 ft. in depth) serves as a neutron moderating and absorbing medium and as a gamma shielding medium. The light water is circulated through external heat exchangers to remove heat generated in the shield 3. An additional gamma shield is provided by 4" thick flanges 28 of mild steel welded to the channels 2.

The neutron scatter plug 1 is of stainless steel, which has a high neutron scattering characteristic. The ribs 6 (and their extensions 6a, 6b) extend to the wall of the channel 2 to make the plug a close fit in the channel, and the plug rests upon the spider support 25 of the fuel element 23. The lower end of the plug 1 is recessed to accommodate the lifting head 26 of the fuel element 23 and the plug is provided with a locating dowel 31 which fits into a hollow portion 32 of the head 26 on the tie 24. The plug 1 is provided with a lifting head 29.

Light water is fed under pressure to the lower end of the channel 2 and is boiled off by heat emitted by the cluster 23. The steam thus generated then passes in an upward direction along the flow paths defined by the ribs 6 (and their extensions) of the plug 1, leaving the upper end of the channel 2 to return in counter flow through a similar channel in another part of the reactor core 4 to receive superheat. The superheated steam is then used to perform useful work; for example, driving a turbine.

Neutrons streaming up the channel 2 impinge on the ribs 6 and are scattered into the surrounding neutron shielding 3 where they are absorbed.

Referring now to FIGURE 3, coolant flowing along the plug 1 first enters the "straight" flow paths 7b to be diverted into the helical flow paths 7, the extension 6b serving as flow straighteners. The change in direction of coolant flow causes a first turning force (indicated by the arrow 33) to be exerted against each of the ribs 6 which tends to rotate the plug. As coolant leaves the helical flow paths 7 it is diverted into an axial direction by impinging on the extensions 6a and the change in direction of the coolant causes a second turning force (indicated by the arrow 34) to be exerted against each of the extensions 6a, the second turning force thus opposing the first turning force.

Because of the different angle of impingement, turning forces shown by the arrow 33 can differ in magnitude from those shown by the arrow 34 and there are also forces acting against the weight of the plug. The difference in turning forces may be changed by changing the obtuse angle between the ribs 6 and their extensions 6a as shown by the dotted line 35, that is, changing the acute angle through which the coolant flow is caused to turn.

In some reactors, for example, as disclosed in British Patent 897,446, the plug 1 can be joined with the fuel elements 23 and be extended upwards to seal (such as with piston ring type of seals) with the tube 2 at a demountable joint. The turning forces, if not restricted in accordance with the invention, can introduce undesirable movement at the seal.

I claim:

1. A neutron scatter plug comprising an elongate body with radially-extending ribs defining a plurality of helical paths for coolant flow along the plug, characterised by the provision of flow deflectors arranged so that coolant flowing out of said helical paths sets up forces in opposition to turning forces exerted on the plug by coolant flowing into said helical paths, said flow deflectors comprising flat non-helical extensions of the ribs.

2. A plug as claimed in claim 1 wherein the flow deflectors are disposed parallel to the axis of the plug.

3. A plug as claimed in claim 1 wherein the flow deflectors are disposed inclined to the axis of the plug.

4. A neutron shield structure incorporating a neutron scatter plug as claimed in claim 1.

5. A nuclear reactor comprising a moderator structure having a lattice of coolant channels for the location of nuclear fuel and a neutron scatter plug as claimed in claim 1 disposed in each of said channels.

6. A nuclear reactor comprising a moderator structure, a neutron shield structure disposed adjacent the moderator structure, a lattice of coolant channels for the location of nuclear fuel penetrating both the moderator structure and the shield structure and a neutron scatter plug as claimed in claim 1 disposed in each of said channels in the region of the shield structure.

References Cited by the Examiner

UNITED STATES PATENTS 2,861,034  11/1958  Wigner et al. _____ 176—43

FOREIGN PATENTS 880,489  10/1961  Great Britain.
897,446  5/1962  Great Britain.

REUBEN EPSTEIN, *Primary Examiner.*

CARL D. QUARFORTH, *Examiner.*